June 27, 1939.  G. G. GREULICH  2,164,108
PROTECTED BEARING PILE
Filed Sept. 9, 1938

Inventor:
GERALD G. GREULICH,
by: John E Jackson
his Attorney.

Patented June 27, 1939

2,164,108

UNITED STATES PATENT OFFICE 2,164,108

PROTECTED BEARING PILE

Gerald G. Greulich, Mount Lebanon, Pa.

Application September 9, 1938, Serial No. 229,178

5 Claims. (Cl. 61—54)

The present invention relates to protective coverings for steel bearing piles and the method of forming the same.

An object of the present invention relates to filling the space between the flanges and web of a bearing pile to prevent water from entering and causing corrosion of the metal.

A further object of the present invention relates to providing filler blocks on each side of the web of an H or I-shaped bearing pile and providing alternate superimposed layers of tar and fabric around the filler blocks and bearing flanges to provide an impervious protective coating thereto.

Other objects and advantages will become apparent as the description proceeds, in which Figure 1 is an elevation showing a steel bearing pile having the protective coating thereon and indicating the water lines;

Figure 1:
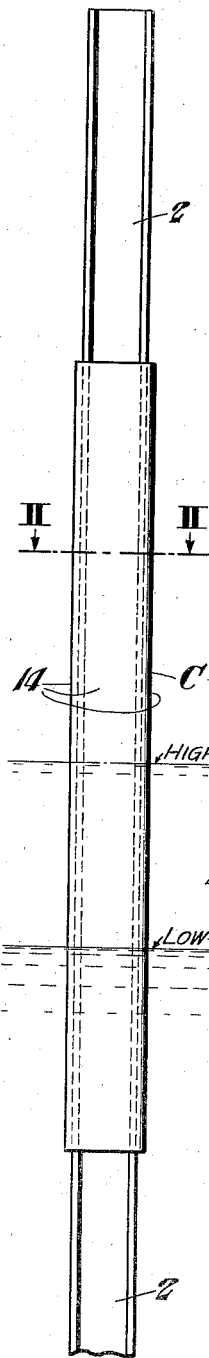
Figure 2:
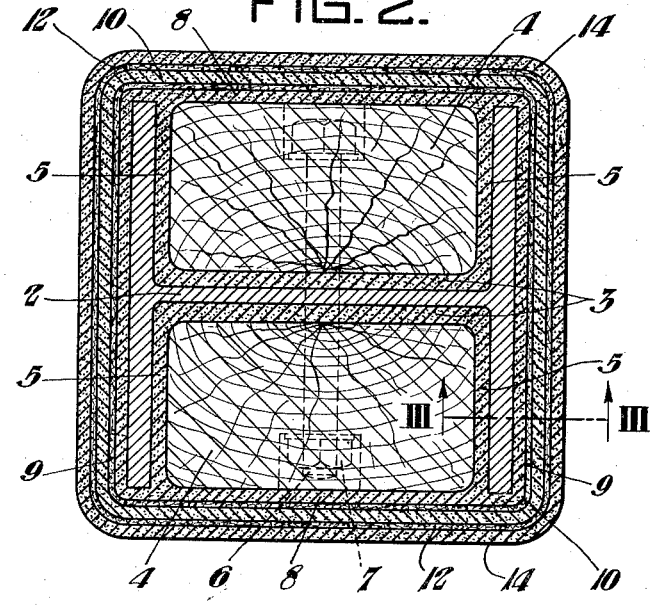
Figure 2 is a section on line II—II of Figure 1.
Figure 3:
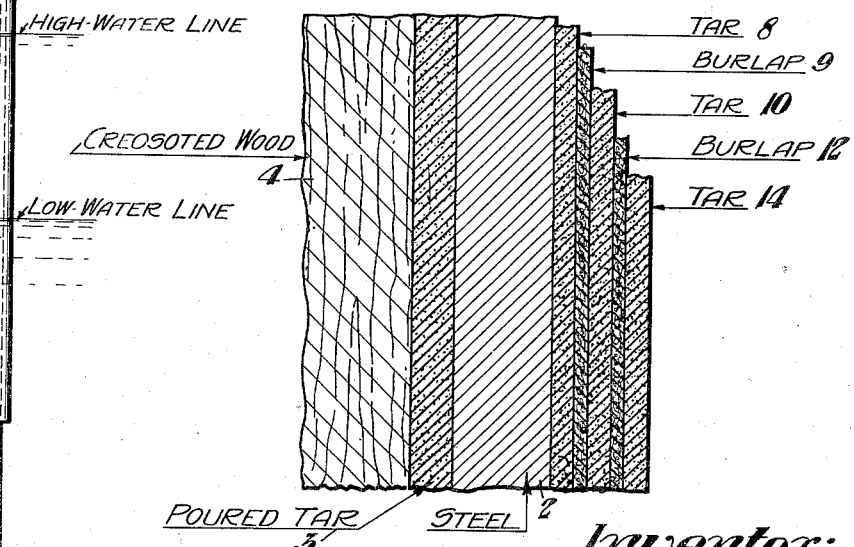
Figure 3 is a section on line III—III of Figure 2.

In the drawing, the numeral 2 represents a steel bearing pile having an H or I-shaped cross-section. A coating of bitumastic material such as coal tar or similar material 3 is applied to each side of the web of said bearing pile and positioned upon said coal tar coating or layer are filler blocks 4 of creosote treated timber or the like. The filler blocks are positioned on each side of the web, between the flanges of the bearing pile, and extend outwardly to a point in substantial alignment with the outer edges of the flanges of said bearing pile. These filler blocks are of a width less than the distance between the inner faces of the flanges in order to provide a space between the filler blocks and the inner faces of the flanges, within which is positioned a layer 5 of coal tar or similar material. One face of the filler blocks is recessed to receive, on one filler block, the enlarged head of a bolt 6 and, on the other filler block, a nut 7 in order to securely retain said filler blocks on said bearing pile.

A coating of bitumastic or similar material 8 is applied around the outer surfaces of the bearing pile and the filler blocks, after which a layer of fabric, open mesh burlap or wire mesh 9 is applied over said bitumastic material 8. Additional alternate layers of fabric and bitumastic material are superimposed upon each other until the required thickness of the protective covering is obtained. In the drawing, the numeral 10 indicates a coating of bitumastic material which is similar to 8, 12 indicates an additional superimposed layer of fabric or like material, and 14 is a coating of bitumastic material.

By the present method of applying alternate layers of tar mopping, open mesh burlap or wire mesh to the desired thickness, there is produced a protective coating which will remain intact under extremes of both high and low temperatures. The wrapping of burlap will prevent the coal tar layers from slumping or sliding down the pile under excessively high temperatures, while the same combination of materials in alternate superimposed relation to each other will prevent the opening up of cracks in the tar layers and the possibility of spalling off of pieces of tar under extremely low temperature.

Also, under the present invention, there is provided a protective covering which can be readily applied to bearing piles which might possibly be damaged by ice during the extreme cold weather. The protective covering can be readily renewed by additional moppings of coal tar and wrappings of fabric and the like.

While I have shown and described a specific embodiment of the present invention, it is to be understood that I do not wish to be limited exactly thereto since various modifications may be made without departing from the scope of my invention as defined by the following claims.

I claim:

1. In a steel bearing pile, a protective covering therefor comprising filler blocks positioned between the flanges and web of said pile, and a layer of bitumastic material and fabric positioned around said bearing pile to completely encase said filler blocks.

2. In a bearing pile having an H or I-shaped cross-section, a protective covering therefor including filler blocks positioned between the flanges and web of said pile on each side of said web and a layer of bitumastic material between said filler blocks and the flanges and web of said bearing pile.

3. In a bearing pile having an H or I-shaped cross-section, a protective covering therefor including filler blocks positioned between the flanges and web of said pile on each side of said web, a layer of bitumastic material between said filler blocks and the flanges and web of said bearing pile, said filler blocks terminating in alignment with the outer edges of said flanges, and a plurality of alternate superimposed layers of bitumastic material and fabric surrounding said filler blocks and flanges of said bearing pile to provide an impervious protective coating therefor.

4. In a steel bearing pile, a protective covering therefor comprising at least one filler block engaging at least two sides of said bearing pile and bitumastic material and fabric positioned around said bearing pile and filler block to provide an impervious protective coating therefor.

5. In a steel bearing pile, a protective covering therefor comprising a filler block engaging at least two sides of said bearing pile, bitumastic material between the filler block and said bearing pile and layers of bitumastic material and fabric alternately positioned around said bearing pile and filler block to completely encase the same and provide an impervious protective coating therefor.

GERALD G. GREULICH.